Aug. 12, 1924.  
E. M. TOBIN ET AL  
1,504,994
DUST REMOVER FOR STONE DRESSING MACHINERY
Filed April 14, 1922
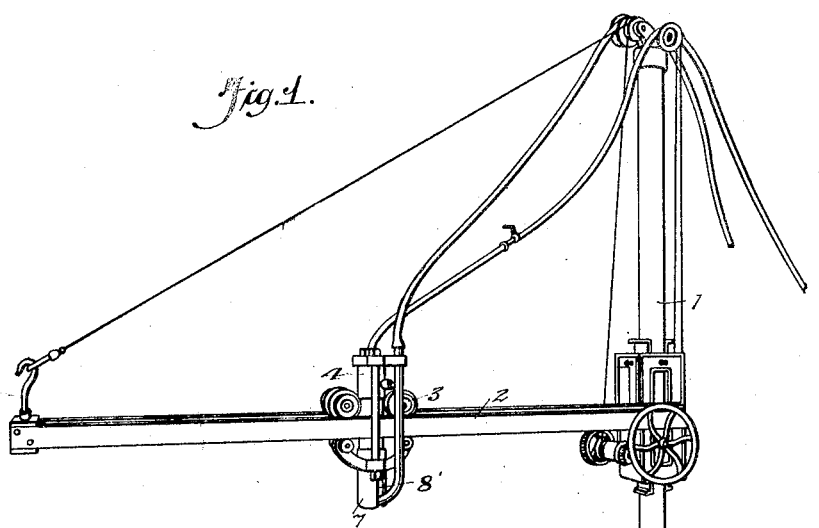
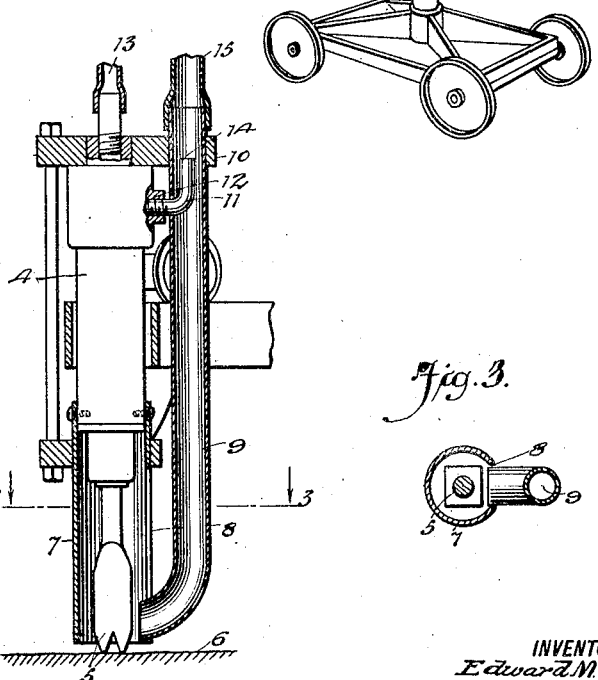
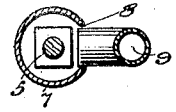
WITNESSES
INVENTORS  
Edward M. Tobin  
Emmet M. White  
BY  
ATTORNEYS Patented Aug. 12, 1924.

1,504,994

UNITED STATES PATENT OFFICE.

EDWARD M. TOBIN AND EMMET M. WHITE, OF BARRE, VERMONT.

DUST REMOVER FOR STONE-DRESSING MACHINERY.

Application filed April 14, 1922. Serial No. 552,666.

*To all whom it may concern:*

Be it known that we, EDWARD M. TOBIN and EMMET M. WHITE, both citizens of the United States, and residents of Barre, in the county of Washington and State of Vermont, have invented a new and Improved Dust Remover for Stone-Dressing Machinery, of which the following is a full, clear, and exact description.

This invention relates to stone working machinery and particularly to means for collecting the dust from pneumatic surfacing machines during the operation of the machine.

The object in view is to provide a construction which will remove the dust from surfacing or other stone dusting machinery without interfering with the operation of the machine while effectively collecting and discharging the dust.

Another object in view is to provide a dust collecting apparatus for surfacing or stone dressing machines of any kind wherein means are presented which will confine the dust to a certain area and then automatically remove the same to a distant point.

A still further object of the invention is to provide a dust removing device for stone dressing machines wherein the air exhaust from the machinery will act in connection with certain devices for producing a rarefaction near the dressing tool so as to draw the dust away from the tool immediately after it has become loosened from the stone.

In the accompanying drawing—

Figure 1 is a perspective view of a pneumatic surfacing machine with an embodiment of the invention applied thereto.

Figure 2 is a longitudinal vertical sectional view through certain parts of the structure shown in Figure 1, illustrating how the invention is applied to the surfacing machine.

Figure 3 is a sectional view through Figure 2 approximately on line 3—3.

Referring to the accompanying drawing by numerals, 1 indicates a surfacing machine of any desired type, said machine being shown as provided with an adjustable pair of carrier bars 2 on which a carrier or truck 3 is mounted and designed to support the pneumatic hammer or head 4 which hammer may be of any design or usual type. The hammer 4 is moved along the carriers 2 and said carriers are swung to the right or left as desired so that the tool 5 may be shifted over the surface of the stone 6 as desired. In operating the tool 5 to produce the desired surface on the stone 6, small particles of the stone are broken off which produce a form of dust. This dust is injurious to the health and it has been found that in the granite districts of Vermont and elsewhere, the life of a stone working mechanic is comparatively short. If a mechanic works on surfacing stones for too long a time, the dust will affect his lungs and eventually cause his death by tuberculosis. In order to avoid this injury to the lungs of the workmen, blowing devices have been provided heretofore for blowing away the dust but even these devices have proven ineffective.

Where the dust is blown away, the life of the workman is longer but, nevertheless, it produces a very injurious action to the lungs and would sooner or later produce death. In the present construction, means have been provided for quickly and automatically removing at a minimum expense the dust resulting from the action of the tool 5. As shown in Figure 2, the tool 5 is surrounded by a hood or apron 7 which is connected with the hammer 4 in any suitable manner, said hood or apron extending almost entirely around the tool 5 but leaving a slot 8 through which the workman may observe the action of the tool and also through which the lower end of the rarefaction tube 9 may extend. The tube 9 is secured to the hammer 4 in any suitable manner, as for instance, by a clamp 10, said tube having an opening near the upper end through which the discharge or ejecting pipe 11 extends. This pipe is connected with the exhaust opening 12 and extends into the pipe 9 and then longitudinally thereof in the center for an appreciable distance. As the hammer 4 operates by compressed air entering through the supply pipe 13, said air is eventually discharged out the opening 12 and, consequently, from the end 14 of the pipe 11. This produces an atomizing or rather an ejecting effect so as to form a rarefaction in the tube 8. This rarefaction will cause the air pressure surrounding the apron 7 to force the dust loosened by the tool 5 into pipe 9 and said dust, with the air, will be carried upwardly past the pipe 11 and into the tube 15. The tube 15 is preferably a flexible tube and may extend to a desired discharge point where the dust may be discharged without injuring the workmen or anyone else.

What we claim is:—

1. The combination with a stone dressing machine operated by compressed air, of a hood almost encircling the tool of the machine whereby an open slot is provided, a suction tube arranged with one end positioned adjacent said slot, said end being substantially round, a pipe extending from the exhaust of said machine into said tube, said pipe having a section extending centrally of and parallel to the tube whereby the discharge from the pipe will be centrally of the tube and in a direction away from the end positioned adjacent said slot, and means connected with the end of the tube opposite that arranged adjacent the slot for guiding the dust and air from the tube to a discharge point.

2. The combination with a stone dressing machine operated by compressed air, of a hood connected with said machine, said hood having a slot extending from the bottom to the top, said hood being positioned to surround the tool of said dressing machine except at the point of the slot whereby the operator may readily observe the action of the tool, and a tubular suction member carried by said dressing machine positioned so that one end will project through said slot at the end nearest to the operating end of the tool whereby the slot is substantially closed at the point nearest the operating tool whereby suction from said pipe will effectively remove the dust produced by the tool without interfering with the operator viewing the action of the tool through the slot.

EDWARD M. TOBIN.
EMMET M. WHITE.